(12) United States Patent
Guccione

(10) Patent No.: US 11,921,351 B2
(45) Date of Patent: Mar. 5, 2024

(54) ATTACHABLE SEWING MIRROR

(71) Applicant: Michael Guccione, St Charles, MO (US)

(72) Inventor: Michael Guccione, St Charles, MO (US)

(73) Assignee: American Sewing Machine, Inc., St Charles, MO (US)

( * ) Notice: Subject to any disclaimer, the term of this patent is extended or adjusted under 35 U.S.C. 154(b) by 0 days.

(21) Appl. No.: 17/872,451

(22) Filed: Jul. 25, 2022

(65) Prior Publication Data

US 2023/0022958 A1 Jan. 26, 2023

Related U.S. Application Data

(60) Provisional application No. 63/225,338, filed on Jul. 23, 2021.

(51) Int. Cl.
*G02B 7/182* (2021.01)
*D05B 79/00* (2006.01)

(52) U.S. Cl.
CPC ............. *G02B 7/182* (2013.01); *D05B 79/00* (2013.01)

(58) Field of Classification Search
CPC ................................. G02B 7/182; D05B 79/00
See application file for complete search history.

(56) References Cited

U.S. PATENT DOCUMENTS

| | | | | |
|---|---|---|---|---|
| 576,165 | A | * | 2/1897 | Shelverton ................ B60R 1/06 248/479 |
| 3,666,938 | A | * | 5/1972 | Dolega .................... F21L 14/00 362/398 |
| 5,070,799 | A | * | 12/1991 | Montgomery ....... D05B 35/064 83/DIG. 1 |
| 5,303,132 | A | * | 4/1994 | Lowder ............... F21V 21/0925 362/397 |
| 6,217,180 | B1 | * | 4/2001 | Eisenbraum ............ B62B 9/005 359/872 |
| 6,499,851 | B1 | * | 12/2002 | Kelly ...................... B60R 1/003 359/872 |
| 6,682,198 | B2 | * | 1/2004 | Mangano ............... A45D 42/16 248/492 |
| 6,847,394 | B1 | * | 1/2005 | Hansen .................. H04N 23/56 348/E5.029 |
| 8,931,914 | B2 | * | 1/2015 | Kim ..................... F21V 21/0965 362/183 |
| 2003/0142424 | A1 | * | 7/2003 | Mangano ............... A45D 42/16 359/871 |
| 2004/0070856 | A1 | * | 4/2004 | Mangano ............... A45D 42/16 359/871 |
| 2005/0132585 | A1 | * | 6/2005 | Weber ..................... B26B 19/40 30/537 |
| 2006/0086571 | A1 | * | 4/2006 | Hubble ................ A01M 31/00 182/187 |

(Continued)

*Primary Examiner* — Lawrence Averick
(74) *Attorney, Agent, or Firm* — Select IP Law Corporation; Ashkon Cyrus

(57) ABSTRACT

According to an embodiment, a mirror is attached to the gooseneck with a mounting bracket. The gooseneck attaches to a second mounting bracket that is affixed to the sewing machine. According to a further embodiment, optional magnets can be affixed to the back of the mirror, thus allowing the user to keep pins off the work surface (by attaching the pins to the back of the mirror).

11 Claims, 1 Drawing Sheet

(56) References Cited

U.S. PATENT DOCUMENTS

2014/0293591 A1* 10/2014 Kim ................. F21V 21/32
362/183
2015/0305496 A1* 10/2015 Sacks ............... A45D 44/02
312/226

* cited by examiner

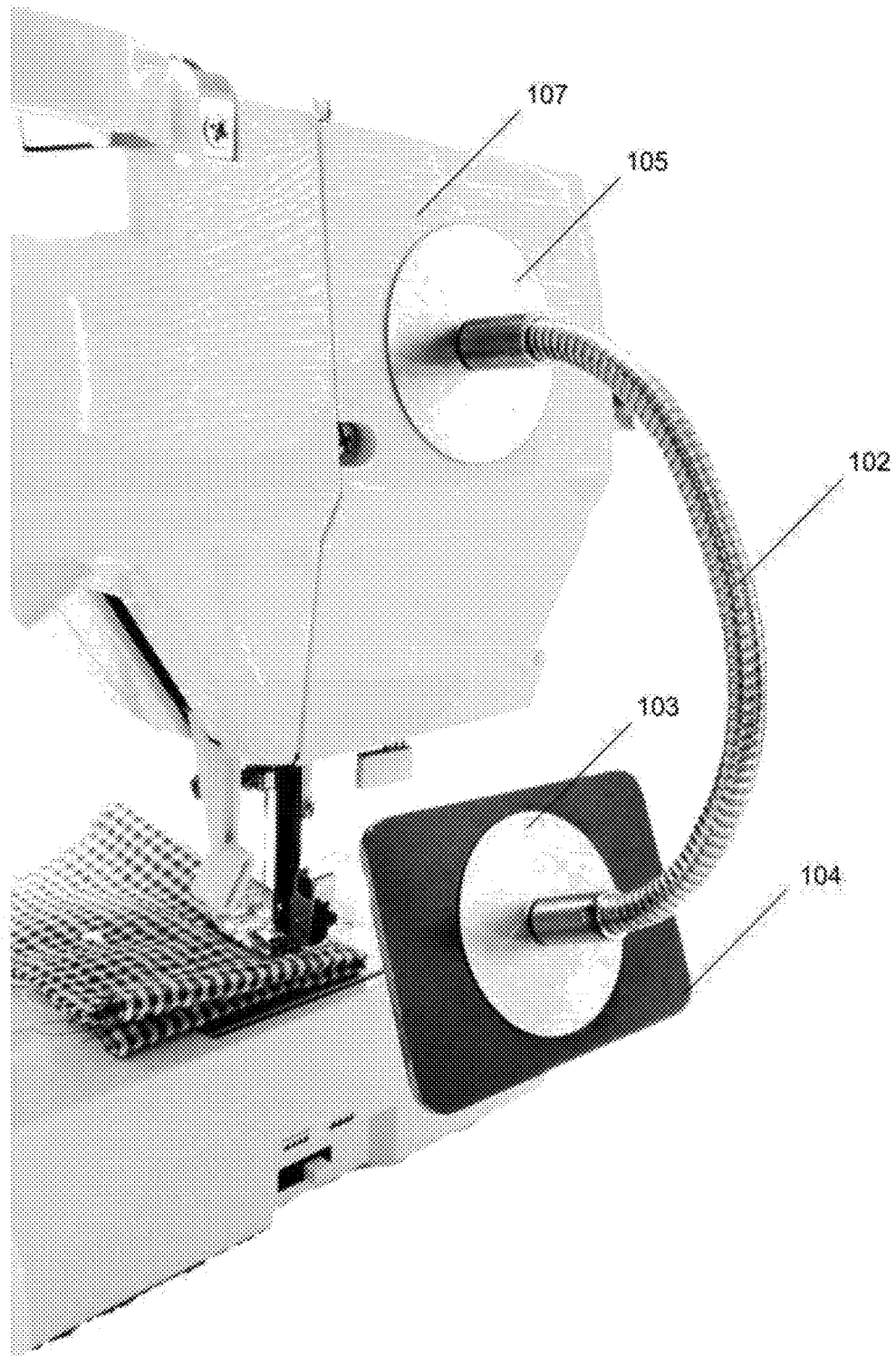

ATTACHABLE SEWING MIRROR

CROSS REFERENCE TO RELATED APPLICATIONS

This application claims the benefit of U.S. Provisional Patent 63/225,338, filed on Jul. 23, 2021, the entirety of which is incorporated by reference.

TECHNICAL FIELD

The present invention relates to mirrors, and specifically mirrors that are related to sewing.

BACKGROUND OF THE DISCLOSURE

Sewing Machines are bulky and require great dexterity to operate. The sewer's position is typically seated and thus this position only provides a limited viewpoint of the sewing needle. Sewing requires specificity when it comes to making a quality product. For example, a seamstress may need to see where a seam has stopped. What is needed is a way to provide additional viewpoints to the sewer, in a quick and easy manner.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

FIG. 1 is an embodiment of the attachable mirror according to an embodiment of the present disclosure.

DETAILED DESCRIPTION OF THE DISCLOSURE

It should be understood at the outset that, although exemplary embodiments are illustrated in the figures and described below, the principles of the present disclosure may be implemented using other techniques. The present disclosure should in no way be explicitly limited to the exemplary implementations and techniques illustrated in the drawings and described below. Additionally, unless otherwise specifically noted, articles depicted in the drawings are not necessarily drawn to scale.

According to an embodiment, a mirror is attached to the gooseneck with a mounting bracket. The gooseneck attaches to a second mounting bracket that is affixed to the sewing machine. According to a further embodiment, optional magnets can be affixed to the back of the mirror, thus allowing the user to keep pins off the work surface (by attaching the pins to the back of the mirror).

The mirror allows a seamstress to pull the mirror into view by bending the gooseneck down. This enables the user to accurately see where the seam has stopped.

Referring now to the figures in more detail, FIG. 1 is an embodiment of an attachable mirror according to an embodiment of the present disclosure. The mirror can be used to attach to a sewing machine and provide a better viewing angle for a sewer or quilter. The mirror 104 is attached to the gooseneck 102 with a mounting bracket 103. The gooseneck attaches to a second mounting bracket 105 that is affixed to the sewing machine 107. In one embodiment, the mounting bracket is magnetic, alternatively a magnetic material can be attached to the mounting bracket.

According to an embodiment, optional magnets can be affixed to the back of the mirror 104, thus allowing the user to keep pins off the work surface. According to an embodiment, the attachable mirror can be magnetically attached to the sewing machine.

The mirror allows a seamstress to pull the mirror into view by bending the gooseneck down. This enables the user to accurately see where the seam has stopped. According to an embodiment, the mounting brackets are made of a magnetic material. According to an embodiment, the mirror can be magnetically attached to the sewing machine.

It can be appreciated that the mirror adds a convenient way for a quilter or sewer to see behind the presser foot, enabling precise starting and stopping while free motion quilting. The design allows one to quickly pull the mirror down when they need it and push it away when not in use.

In one embodiment, magnets are provided that attach to the back of the mirror to hold pins. In a further embodiment, included are two halos that can be affixed to the machine to hold pens, chalk liners, and other items.

Modifications, additions, or omissions may be made to the systems, apparatuses, and/or methods described herein without departing from the scope of the disclosure. For example, various components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Modifications, additions, or omissions may be made to the systems, apparatuses, and/or methods described herein without departing from the scope of the disclosure. For example, various components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. An attachable sewing mirror, comprising:
   a single mirror attached to a bendable gooseneck with a mounting bracket;
   a second mounting bracket attached the bendable gooseneck, wherein the second mounting bracket is magnetically affixed to a sewing machine;
one or more magnets affixed to the back of the mirror; and
pins magnetically attached to the back of mirror via the one more magnets.

2. The mirror of claim 1,
wherein the second mounting bracket comprises a magnetic material.

3. The mirror of claim 1,
further comprising a magnetic material attached to the mounting bracket.

4. The mirror of claim 1,
further comprising a magnet affixed to the back of the mirror.

5. A method of mounting an attachable sewing mirror to a sewing machine, comprising:
providing a mirror attached to a bendable gooseneck with a mounting bracket;
providing a second mounting bracket attached the bendable gooseneck,
wherein the second mounting bracket is configured to be affixed to a sewing machine; magnetically attaching the second mounting bracket to a sewing machine;
affixing one or more magnets to the back of the mirror; and magnetically attaching pins to the back of mirror via the one more magnets.

6. The method of claim 5,
wherein the second mounting bracket comprises a magnetic material.

7. The method of claim 5,
further comprising providing a magnetic material attached to the mounting bracket.

8. The method of claim 5,
further comprising providing a magnet affixed to the back of the mirror.

9. The method of claim 5,
further comprising pulling the mirror into view by bending the gooseneck down.

10. The method of claim 7,
further comprising pushing the mirror away by bending the gooseneck up.

11. The mirror of claim 2,
wherein one or more halos are affixed to the sewing machine configured to hold pens, chalk liners, and other items.

* * * * *